(12) United States Patent
Mittal et al.

(10) Patent No.: US 7,076,645 B2
(45) Date of Patent: Jul. 11, 2006

(54) METHOD OF REBOOTING A MULTI-DEVICE CLUSTER WHILE MAINTAINING CLUSTER OPERATION

(75) Inventors: Ajay Mittal, Foster City, CA (US); Laura Xu, Sunnyvale, CA (US); Srikanth Koneru, Santa Clara, CA (US)

(73) Assignee: Nokia Inc., Irving, TX (US)

( * ) Notice: Subject to any disclaimer, the term of this patent is extended or adjusted under 35 U.S.C. 154(b) by 134 days.

(21) Appl. No.: 10/606,645

(22) Filed: Jun. 25, 2003

(65) Prior Publication Data

US 2004/0268112 A1  Dec. 30, 2004

(51) Int. Cl.
*G06F 11/00* (2006.01)
(52) U.S. Cl. .................... 713/1; 713/2; 714/4; 714/11; 714/12; 714/13
(58) Field of Classification Search .............. 713/1, 713/2, 100; 717/169, 175; 714/4, 11–13
See application file for complete search history.

(56) References Cited

U.S. PATENT DOCUMENTS

| | | | | |
|---|---|---|---|---|
| 6,044,461 | A * | 3/2000 | Agha et al. | 713/1 |
| 6,202,097 | B1 * | 3/2001 | Foster et al. | 709/238 |
| 6,324,692 | B1 * | 11/2001 | Fiske | 717/171 |
| 6,691,244 | B1 * | 2/2004 | Kampe et al. | 714/4 |
| 6,757,836 | B1 * | 6/2004 | Kumar et al. | 714/4 |
| 6,779,176 | B1 * | 8/2004 | Chambers et al. | 717/169 |
| 2003/0149735 | A1 * | 8/2003 | Stark et al. | 709/208 |
| 2004/0153704 | A1 * | 8/2004 | Bragulla et al. | 714/4 |
| 2004/0158575 | A1 * | 8/2004 | Jacquemot et al. | 707/102 |

* cited by examiner

*Primary Examiner*—A Elamin
(74) *Attorney, Agent, or Firm*—Thomas R. Marquis; Darby & Darby PC

(57) ABSTRACT

The present invention is directed at rebooting a cluster while maintaining cluster operation. Cluster operation is automatically maintained during the reboot since at least one member of the cluster stays active during the process. An administrator triggers the reboot process and then does not have to perform any other steps during the reboot process. An algorithm executes which reboots members of the cluster at different times, while always maintaining operation of at least one member of the cluster.

17 Claims, 5 Drawing Sheets

METHOD OF REBOOTING A MULTI-DEVICE CLUSTER WHILE MAINTAINING CLUSTER OPERATION

BACKGROUND OF THE INVENTION

Equipment that provides a high degree of reliability is a prime consideration of organizations that supply Internet and Intranet services. To help meet this need, technology has become available to combine several devices into a cluster that is configured to act as a single device. Using the cluster arrangement, it is intended that the failure of one device does not significantly affect the remaining components within the cluster.

The term for starting software on a device is 'booting' (short for 'bootstrapping'); when this is performed on a device that is active, the term is 'rebooting'. A reboot is normally performed for a variety of reasons, including: to activate new versions of the software; and to restore functionality of the device after a fatal error in the software that prevents the device's operation.

In a cluster environment, the reboot of devices requires special consideration, since maintenance of the cluster functionality is of utmost importance. Rebooting the cluster, however, may interfere with its operation. What is needed is a way to reboot members of a cluster such that the cluster operation is maintained.

SUMMARY OF THE INVENTION

The present invention is directed at rebooting a cluster while maintaining cluster operation.

According to one aspect of the invention, cluster operation is automatically maintained during the reboot. During the cluster reboot process at least one member of the cluster remains active during the rebooting of the other members.

According to another aspect of the invention, a user, such as an administrator triggers the cluster reboot process. The administrator does not have to manually reboot each member of the cluster. Instead, the cluster reboot process handles the reboots of the members.

According to another aspect, an algorithm is executed which reboots members of the cluster at different times. Rebooting all cluster members at the same time would cause the operation of the cluster to be lost until at least one member is restored to operation.

DETAILED DESCRIPTION OF THE PREFERRED EMBODIMENT

Figure 1:
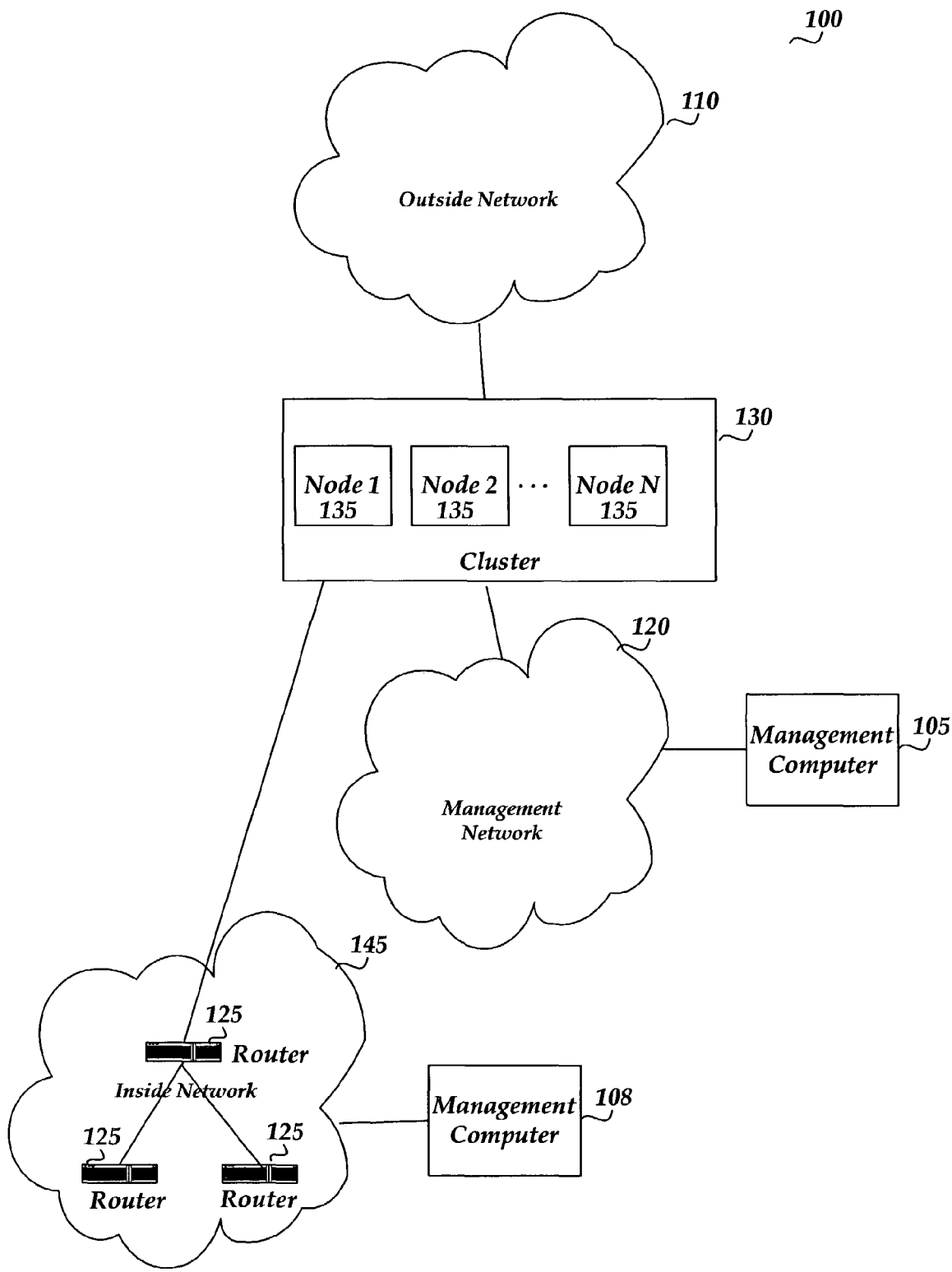
FIG. 1 illustrates an exemplary cluster rebooting environment.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise.

The term "IP" means any type of Internet Protocol. The term "node" means a device that implements IP. The term "router" means a node that forwards IP packets not explicitly addressed to itself. The term "routable address" means an identifier for an interface such that a packet is sent to the interface identified by that address. The term "link" means a communication facility or medium over which nodes can communicate. The term "cluster" refers to a group of nodes configured to act as a single node.

The following abbreviations are used throughout the specification and claims: RMB Remote Management Broker; CS=Configuration Subsystem; CLI=Command Line Interface; CM=Cluster Management; GUI=Graphical User Interface; MAC=Message Authentication Code; and NM=Network Management.

Referring to the drawings, like numbers indicate like parts throughout the views. Additionally, a reference to the singular includes a reference to the plural unless otherwise stated or is inconsistent with the disclosure herein.

FIG. 1 illustrates an exemplary cluster rebooting environment, in accordance with aspects of the invention. As shown in the figure, rebooting environment 100 includes management computers 105 and 108, cluster 130, outside network 110, management network 120, routers 125, and inside network 145. Cluster 130 includes nodes 135 that are arranged to act as a single node. The networks may be wired or wireless networks that are coupled to wired or wireless devices.

The present invention is directed at rebooting a cluster while maintaining cluster operation. At least one member of the cluster stays active during the reboot process. An administrator triggers the reboot process and then does not have to perform any other steps during the reboot process. An algorithm is executed which reboots members of the cluster at different times while always maintaining operation of at least one member of the cluster.

As illustrated, inside network 145 is an IP packet based backbone network that includes routers, such as routers 125 to connect the support nodes in the network. Routers are intermediary devices on a communications network that expedite message delivery. On a single network linking many computers through a mesh of possible connections, a router receives transmitted messages and forwards them to their correct destinations over available routes. On an interconnected set of LANs, including those based on differing architectures and protocols, a router acts as a link between LANs, enabling messages to be sent from one to another. Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links.

Management computer 105 is coupled to management network 120 through communication mediums. Management computer 108 is coupled to inside network 145 through communication mediums. Management computers 105 and 108 may be used to manage a cluster, such as cluster 130, as well as to trigger a cluster reboot.

Furthermore, computers, and other related electronic devices may be connected to network 110, network 120, and network 145. The public Internet itself may be formed from a vast number of such interconnected networks, computers, and routers. IP network 100 may include many more components than those shown in FIG. 1. However, the components shown are sufficient to disclose an illustrative embodiment for practicing the present invention.

The media used to transmit information in the communication links as described above illustrates one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Figure 2:
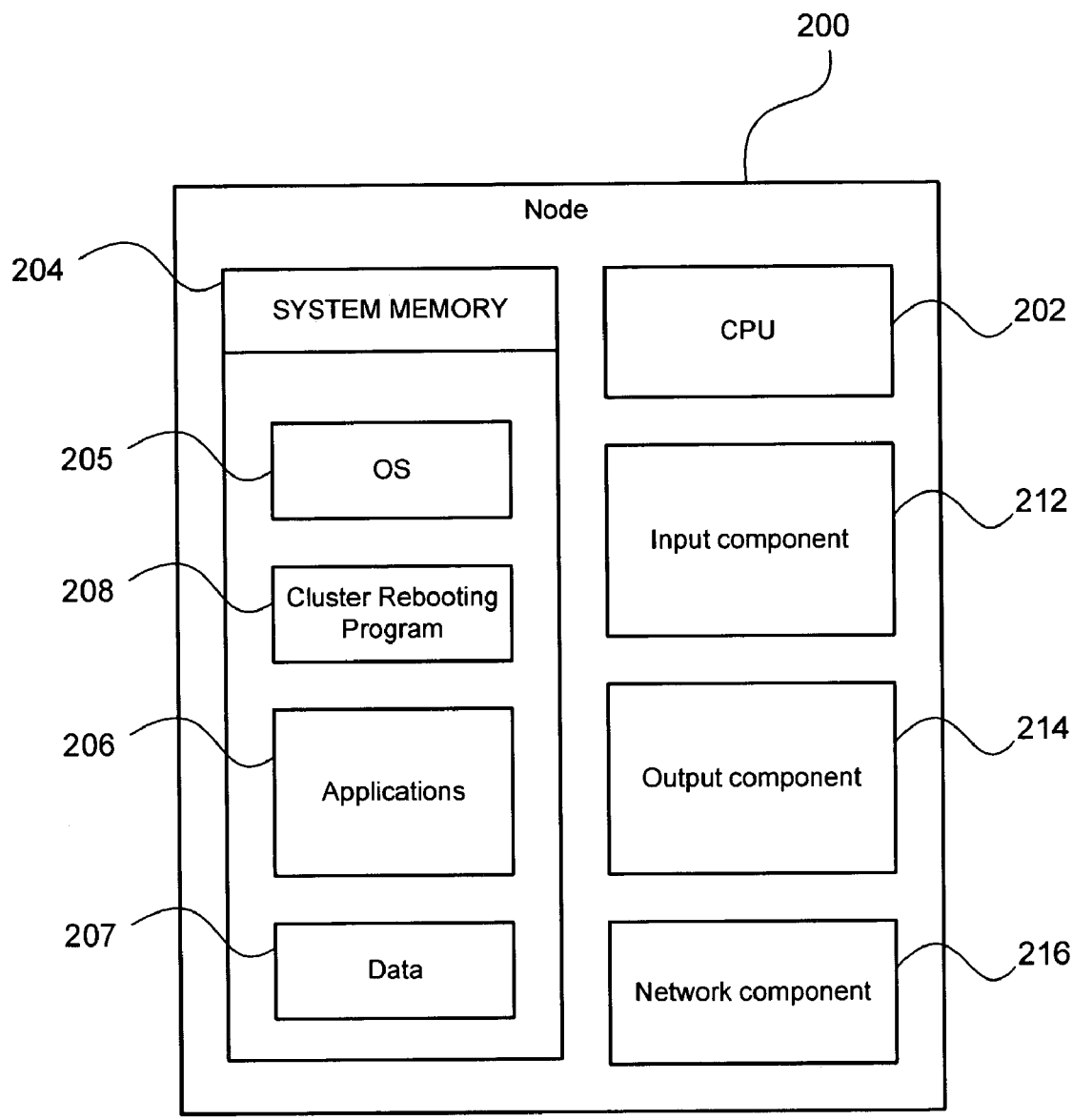
FIG. 2 illustrates an exemplary computing device that may be used.

FIG. 2 illustrates an exemplary computing device that may be used in accordance with aspects of the invention. For illustrative purposes, node 200 is only shown with a subset of the components that are commonly found in a computing device. A computing device that is capable of working in this invention may have more, less, or different components as those shown in FIG. 2. Node 200 may include various hardware components. In a very basic configuration, Node 200 typically includes central processing unit 202, system memory 204, and network component 216.

Depending on the exact configuration and type of computing device, system memory 204 may include volatile memory, non-volatile memory, data storage devices, or the like. These examples of system memory 804 are all considered computer storage media. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by node 200. Any such computer storage media may be part of node 200.

Node 200 may include input component 212 for receiving input. Input component 212 may include a keyboard, a touch screen, a mouse, or other input devices. Output component 214 may include a display, speakers, printer, and the like.

Node 200 may also includes network component 216 for communicating with other devices in an IP network. In particular, network component 216 enables node 200 to communicate with mobile nodes and corresponding nodes. Node 200 may be configured to use network component 216 to receive and send packets to and from the corresponding nodes and the mobile nodes. The communication may be wired or wireless.

Signals sent and received by network component 216 are one example of communication media. The term computer readable media as used herein includes both storage media and communication media.

Software components of node 200 are typically stored in system memory 204. System memory 204 typically includes an operating system 205, one or more applications 206, and data 207. As shown in the figure, system memory 204 may also include cluster rebooting program 208. Program 208 is a component for performing operations relating to rebooting a cluster as described herein. Program 208 includes computer-executable instructions for performing processes relating to cluster rebooting.

Figure 3:
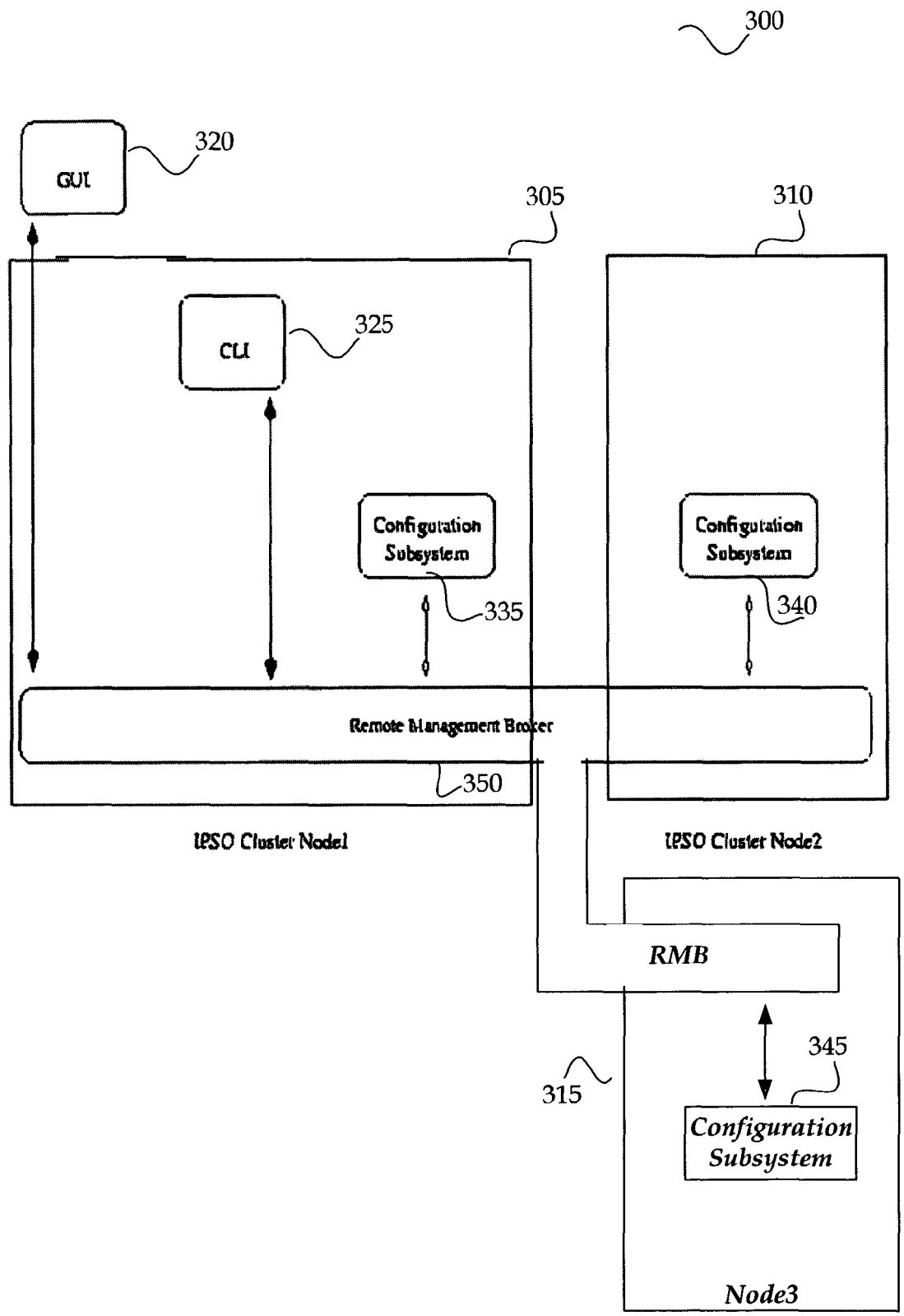
FIG. 3 shows an exemplary architecture of a cluster.

FIG. 3 shows an exemplary architecture of a cluster, in accordance with aspects of the invention. As shown in the figure, cluster 300 includes nodes 305, 310, and 315; GUI 320, CLI 325, Configuration Subsystems 335, 340, and 345 and RMB 350.

The GUI and CLI may be configured to present a view of a node(s) within the cluster. RMB 350 distributes information between the nodes within the cluster.

According to one embodiment, GUI 320 is configured to execute on a workstation (not shown) and interact with Configuration Subsystem 325 of device 305. GUI 320 provides a graphical interface to perform operations relating to device 305. One of these operations is performing a reboot of a cluster. CLI 325 provides a command line interface that allows the user to perform operations on device 305 by an application executing on device 305. The GUI and CLI associated with device 305 may also be used to trigger a cluster reboot.

RMB 350 is configured to communicate with device 305 and other devices (device 310 and device 315) within the cluster. RMB 350 may be included within device 305 or it may be separate from device 305. Generally, RMB 350 is used to communicate information between the members of the cluster.

According to one embodiment, the system acquires exclusive authority of the cluster during the reboot process. This helps to prevent more than one user or system from affecting the devices during the reboot.

According to one embodiment, GUI 320 is implemented as a set of Web pages in a browser and a Web Server. The server may operate on a device within the cluster or a device separate from the cluster. The server may operate on all or some of the cluster members.

CLI 325 is a management CLI that presents the cluster information relating to the device and the cluster textually to a user.

When the reboot process is initiated, RMB 350 interacts with the configuration subsystems of the devices being rebooted. According to one embodiment, when an error occurs during a reboot with one of the cluster members, the reboot process is stopped. According to one embodiment, RMB 350 may be configured to restore the configurations to the devices before the reboot process began. This helps to ensure that all the members of the cluster maintain the same attributes. When a problem occurs RMB 350 may indicate that there was a failure to the GUI and CCLI, or send the error to some other location. When the rebooting is complete, the administrator may perform other operations.

The reboot action is triggered by a control in an application using the Graphical User Interface (GUI) or a command in a Command Line Interface (CLI) shell.

The control or command causes a script to be run that performs the cluster rebooting process. The script initiates a reboot by contacting each cluster member, providing an attribute that causes each member to temporarily be removed from the cluster, and then providing an attribute that causes the reboot operation to begin. The script then detects the loss of contact with the device and attempts to re-establish contact. When the script has established contact, it internally indicates that that device is now rebooted and informs the administrator which device has been rebooted. According to one embodiment, the device from which the rebooting process is initiated is not rebooted until all of the other devices have been rebooted.

The reboot for all of the devices, except for the one on which the reboot is initiated, can either be performed sequentially (one device at a time) or in parallel. The parallel method reduces the overall time needed to restore the cluster to full operation.

If the reboot fails on any of the devices, as indicated by failure to re-establish contact with the device, the reboot process halts, thereby preserving the state of the devices not rebooted. The administrator is informed that the cluster reboot has been stopped prematurely along with the identity of the device or devices that have failed.

Figure 4:
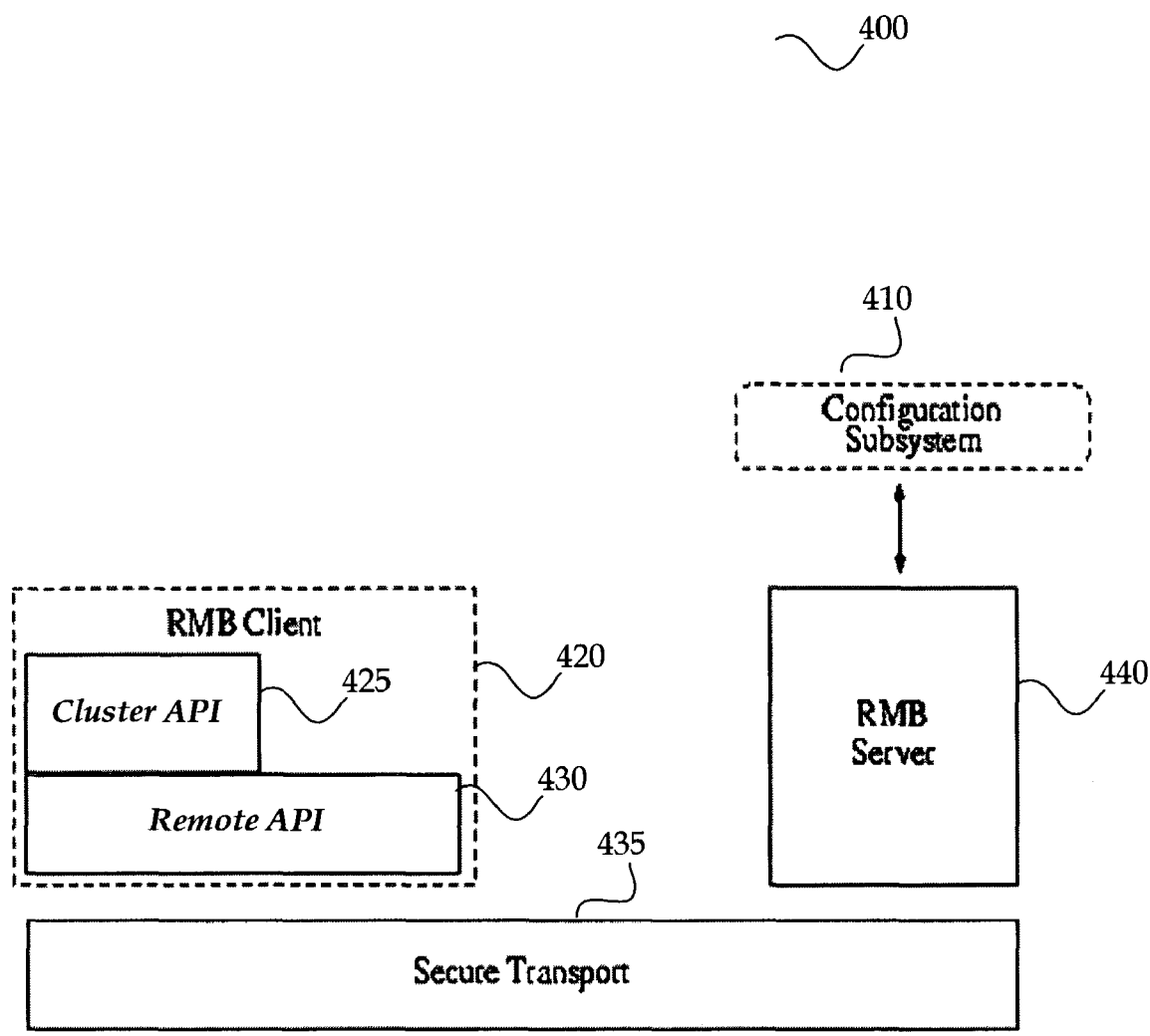
FIG. 4 illustrates components of the RMB.

FIG. 4 illustrates components of the RMB, in accordance with aspects of the invention. As illustrated in the figure, RMB 400 includes RMB Client 420, configuration subsystem 410, RMB Server 440 and secure transport 435. RMB Client 420 includes Cluster API (application programming interface) 425 and Remote API 430. Cluster API 425 maintains information about the cluster's members. Remote API 430 maintains information about each cluster member and tracks NM operations. Secure Transport 435 delivers and receives messages to perform NM operations, such as the cluster reboot operation, and performs integrity checks on the messages. RMB Server 440 is arranged to communicate with configuration subsystem 410 and communicates with RMB client 420 through secure transport 435.

Remote Management System 400 acts as the backbone for the nodes within the cluster. RMB 400 provides base mechanisms including: discovering the members within the cluster; delivering queries and operations relating to NM attributes to the devices in the cluster; ensuring message integrity; an interface for management applications; and an interface to each device's local configuration subsystem. RMB 400 also includes a secure mechanism for transporting the information in the messages sent between the nodes within the cluster.

RMB 400 is also configured to automatically query the nodes it is coupled with in order to determine the cluster members. These queries are performed periodically to help ensure that all cluster members are available at any given time.

According to one embodiment, RMB 400 ensures consistency of the configuration by using database transactions. For example to begin a transaction whenever an attribute is to be changed and applying a 'commit' database operation if the change is successful on all devices and a 'rollback' operation when the change fails on any device. The RMB may implement these transactions either internally or by using the transaction capabilities of the Configuration Subsystem. According to one embodiment, the Configuration Subsystem's transactions are used since these may be complicated operations.

RMB Client 420 uses Cluster API 425 to discover the cluster's member devices.

RMB 400 uses messages to perform system and NM operations. The system operations include acquiring and releasing the configuration lock. When a message is to be sent, the RMB fills in header and delivers the message. When a message is received, the RMB checks the header and accepts the message only if values in the fields of the header are valid. The RMB discards any message whose header has invalid values in the fields.

RMB Client 420 composes the body of a RMB message and uses Cluster API 425 to deliver the message to the cluster members; receive the responses from the members; and extract the result of the operation from the message. Remote API 430 delivers the message to a particular cluster member and checks that a response message is received for every request message sent. Secure Transport 435 is the transport mechanism that actually sends and receives the messages.

The RMB Client can be implemented as a collection of shared-object libraries with well-defined Application Programming Interfaces (APIs). CGUI and CCLI can use these APIs to interact with the RMB to perform NM operations.

The RMB Server can be implemented as a daemon that is launched during system start-up.

RMB's Secure Transport can be implemented as a Secure Sockets Layer (SSL) socket. This provides and extra layer of security by providing the ability to encrypt the RMB messages.

Figure 5:
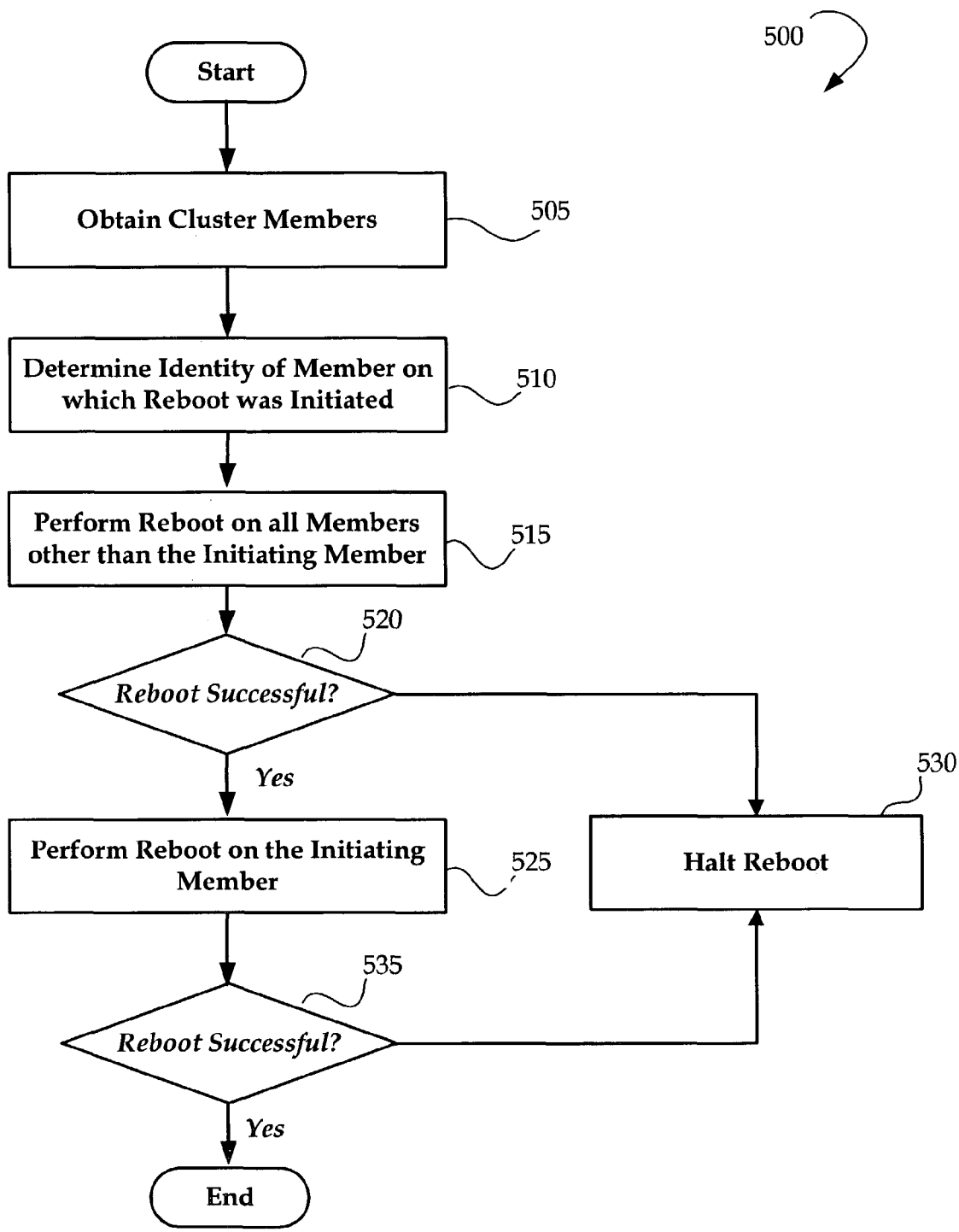
FIG. 5 shows a process for rebooting a cluster; in accordance with aspects of the invention.

FIG. 5 shows a process for rebooting a cluster, in accordance with aspects of the invention. After a start block, process 500 flows to block 505 where a list of cluster members is obtained. The list of cluster members is used to help ensure that all of the cluster members are rebooted. Moving to block 510, the identity of the member on which the reboot is initiated is obtained. Flowing to block 515, a reboot is performed on each member of the cluster other than the member who initiated the reboot. According to one embodiment, the cluster members minus the initiating member are rebooted in parallel. For example, if there are five members of the cluster then four of the five members are rebooted at the same time. As discussed above, the members may be rebooted in any order, so long as at least one member remains active during the rebooting of the other members. Moving to decision block 520, a determination is made as to whether an error occurred during the cluster reboot on the members other than the initiating member. When an error occurs, the process flows to block 530, where the reboot process is halted. Transitioning to block 525, a reboot is performed on the member initiating the cluster reboot. Moving to decision block 530, a determination is made as to whether an error occurred during any step of the cluster reboot. When an error occurs, the process flows to block 530, where the reboot process is halted. When there are no errors, the process flows to an end block and returns to processing other actions.

The above specification, examples and data provide a complete description of the invention. Since many embodiments of the invention can be made without departing from the spirit and scope of the invention, the invention resides in the claims hereinafter appended.

What is claimed is:

1. A method for rebooting a cluster, comprising:
   initiating a reboot of the cluster;
   determining cluster members; and
   rebooting each of the cluster members while at least one of the cluster members remains active while the other cluster members are being rebooted, wherein rebooting each of the cluster members comprises removing the cluster member being rebooted and determining when the removed cluster member has been rebooted.

2. The method of claim 1, further comprising determining an initiating cluster member that initiated the reboot and controlling the rebooting from the initiating cluster member.

3. The method of claim 1, wherein rebooting each of the cluster members while the at least one of the cluster members remains active while the other cluster members are being rebooted further comprises rebooting the cluster members other than the at least one of the cluster members that remains active in parallel.

4. The method of claim 2, wherein the at least one of the cluster members that is maintaining normal operation is the initiating cluster member.

5. The method of claim 1, wherein initiating the reboot of the cluster is performed by a user.

6. The method of claim 1, wherein determining when the removed cluster member has been rebooted further comprises attempting to re-establish contact wit the removed cluster member.

7. The method of claim 1, further comprising halting the reboot process when it is determined that an error occurs during the reboot process.

8. A system for rebooting a cluster while maintaining operation of the cluster, comprising:
 a network interface configured to communicate with cluster members;
 a memory configured to store information relating to the cluster;
 a remote management broker (RMB) configured to distribute information to the cluster members; and
 a processor configured to perform actions, including:
  initiating a reboot of the cluster;
  determining the cluster members; and
  rebooting each of the cluster members while at least one of the cluster members remains active while the other cluster members are being rebooted, wherein rebooting each of the cluster members comprises removing the cluster member being rebooted and determining when the removed cluster member has been rebooted.

9. The system of claim 8, further comprising determining an initiating cluster member that initiated the reboot and controlling the rebooting from the initiating cluster member.

10. The system of claim 8, wherein rebooting each of the cluster members further comprises rebooting each cluster member other than at least one cluster member that remains active in parallel.

11. The system of claim 10, wherein the at least one of the cluster member is the initiating cluster member.

12. The system of claim 8, further comprising a user interface used to initiate the reboot of the cluster.

13. The system of claim 8, wherein determining when the removed cluster member has been rebooted farther comprises attempting to re-establish contact with the removed cluster member.

14. The system of claim 8, further comprising halting the reboot process when it is determined that an error occurs during the reboot process.

15. An apparatus for rebooting a cluster while maintaining operation of the cluster, comprising:
 means for initiating a reboot of the cluster;
 means for determining cluster members; and
 means for rebooting each of the cluster members while at least one of the cluster members remains active while the other cluster members are being rebooted, wherein the means for rebooting each of the cluster members comprises means for removing the cluster member being rebooted and means for determining when the removed cluster member has been rebooted.

16. The apparatus of claim 15, wherein determining when the removed cluster member has been rebooted further comprises means for attempting to re-establish contact with the removed cluster member.

17. A computer readable storage medium, comprising executable instructions for performing actions, including:
 initiating a reboot of the cluster;
 determining cluster members; and
 rebooting each of the cluster members while at least one of the cluster members remains active while the other cluster members are being rebooted, wherein rebooting each of the cluster members comprises removing the cluster member being rebooted and determining when the removed cluster member has been rebooted.

* * * * *

UNITED STATES PATENT AND TRADEMARK OFFICE
CERTIFICATE OF CORRECTION

| | | |
|---|---|---|
| PATENT NO. | : 7,076,645 B2 | Page 1 of 1 |
| APPLICATION NO. | : 10/606645 | |
| DATED | : July 11, 2006 | |
| INVENTOR(S) | : Ajay Mittal et al. | |

It is certified that error appears in the above-identified patent and that said Letters Patent is hereby corrected as shown below:

In the Application:

Title Page Col. 2, (74) (Attorney, Agent or Firm), Line 2, After "Darby" delete "PC" and insert -- P.C. --.

Column 1, Line 60, Delete "EMBODIMENT" and insert -- EMBODIMENTS --.

Column 3, Line 35, Delete "Node" and insert -- node --.

Column 4, Line 53, Delete "CCLI," and insert -- CLI, --.

Column 6, Line 10, Delete "CGUI" and insert -- GUI --.

Column 6, Line 10, Delete "CCLI" and insert -- CLI --.

Column 6, Line 66, In Claim 3, after "while" delete "the".

In the Claims:

Column 7, Line 11, In Claim 6, delete "wit" and insert -- with --.

Column 8, Line 6, In Claim 13, delete "farther" and insert -- further --.

Signed and Sealed this

Twenty-sixth Day of December, 2006

JON W. DUDAS
*Director of the United States Patent and Trademark Office*